United States Patent [19]
Tohma et al.

[11] Patent Number: 5,851,660
[45] Date of Patent: Dec. 22, 1998

[54] METHOD OF FABRICATING A THIN-FILM MAGNETIC RECORDING MEDIUM AND THIN-FILM MAGNETIC RECORDING MEDIUM

[75] Inventors: Kiyokazu Tohma, Hirakata; Kazunari Yoshimoto, Kyoto; Ryuji Sugita, Hirakata, all of Japan

[73] Assignee: Matsushita Electric Industrial Co., Ltd., Japan

[21] Appl. No.: 743,827

[22] Filed: Nov. 5, 1996

[30] Foreign Application Priority Data

Nov. 30, 1995 [JP] Japan .................................. 7-311789

[51] Int. Cl.⁶ ...................................................... B05D 3/04
[52] U.S. Cl. ....................... 428/336; 427/128; 427/255.2; 427/255.3; 427/294; 427/398.1; 427/593; 427/598; 428/457; 428/694 T; 428/900; 428/928
[58] Field of Search ..................................... 427/593, 128, 427/255.2, 255.3, 294, 398.1, 598; 428/336, 694 T, 900, 928, 457

[56] References Cited

U.S. PATENT DOCUMENTS 4,900,622  2/1990  Nakayama et al. ..................... 428/336
5,585,139  12/1996  Steininger et al. ..................... 427/128

*Primary Examiner*—Bernard Pianalto
*Attorney, Agent, or Firm*—Parkhurst & Wendel

[57] ABSTRACT

The objective of the present invention is to provide a method of fabricating a thin film magnetic recording medium where excellent read/write characteristics and high productivity are obtained and also to provide the thin film magnetic recording medium. The present invention is a method of fabricating a thin film magnetic recording medium where vapor evaporation is given by a vacuum evaporation device onto a traveling substrate to form a magnetic layer. The temperature of a reevaporation member, disposed so as to be opposed to the substrate on the downstream side of a magnetic layer formation start portion where the magnetic layer begins to form, is raised to higher than the melting point of an evaporation material. Atoms, which are evaporated from an evaporation source and reach said reevaporation member for forming said magnetic layer, are reevaporated by the raised temperature of the reevaporation member. The atoms reevaporated and atoms evaporated directly from said evaporation source are mixed together and then the mixed atoms are caused to reach said substrate at the same time to form the magnetic layer.

17 Claims, 9 Drawing Sheets

METHOD OF FABRICATING A THIN-FILM MAGNETIC RECORDING MEDIUM AND THIN-FILM MAGNETIC RECORDING MEDIUM

FIELD OF THE INVENTION

The present invention relates to a thin film magnetic recording medium with excellent read/write characteristics at high density and a method of fabricating the thin film magnetic recording medium.

BACKGROUND OF THE INVENTION

In recent years, the recording density of a magnetic recording device has been increased and a magnetic recording medium with excellent read/write characteristics at short wavelength has been demanded. A particulate magnetic recording medium where magnetic powder is coated on a substrate is presently been used extensively as a magnetic recording medium. However, the particulate magnetic recording medium does not sufficiently meet the aforementioned demand.

Then, a thin film magnetic recording medium, which can be fabricated by vacuum evaporation, sputtering, or plating and exhibits excellent read/write characteristics at short wavelength, has been given attention as an alternate for the magnetic recording medium. Various kinds of magnetic materials, such as Co, Co—Ni, Co—Ni—P, Co—O, Co—Ni—O, Co—Cr, Co—Ni—Cr, Co—Cr—Ta, Co—Cr—Pt and the like, have been examined as a magnetic layer of this thin film magnetic recording medium. From the point of application to magnetic tape it has been considered that Co—O and Co—Ni—O are most suitable among the aforementioned magnetic materials. Evaporation tape with Co—Ni—O as the magnetic layer has already been put to practical use as a Hi-8 VTR (video tape recorder) tape.

A method of fabricating an evaporation tape will hereinafter be described with FIG. 9 as example of a conventional method of fabricating a thin film magnetic recording medium. FIG. 9 is a diagrammatic sectional view showing an example of the internal structure of a conventional vacuum evaporation device for fabricating evaporation tape.

A substrate 1, wound around a supply roll 2, travels in a direction (a) along a cylindrical can 3 being cooled and is wound onto a take-up roll 4. Here the substrate 1 is a film-shaped substrate consisting of polymer material, such as polyethylene terephthalate film, polyimide film, polyamide film, polyether imide film, polyethylene naphthalate film or the like. The substrate 1 is not limited to these films. An evaporation source 5 is filled with metal or an alloy, such as Co or Co—Ni, as evaporation material 6. It is preferable that the evaporation source 5 be a source which can evaporate even metal with a high melting point (such as cobalt) at a high evaporation speed, such as an electron beam evaporation source.

In a vacuum evaporation device such as this, by raising the temperature of the evaporation source 5 to higher than the melting point of the evaporation material 6, evaporated atoms from the evaporation source 5 adhere to the substrate 1 to form a magnetic layer. When this occurs, it is important to accurately control the amount of the evaporated atoms that adhere to the substrate 1. For this reason, shielding plates 7 and 8 are provided near the circumference of the cylindrical can 3 in order to prevent unnecessary evaporated atoms from adhering to the substrate 1.

The shielding plate 7 is used for determining an initial angle of incidence (hereinafter referred to as $\phi i$) at which the evaporated atoms are incident upon the magnetic layer formation start portion of the substrate 1. The shielding plate 8 is used for determining an end angle of incidence (hereinafter referred to as $\phi f$) at which the evaporated atoms are incident upon the magnetic layer formation end portion of the substrate 1. Here the angle of incidence of the evaporated atom is defined by an angle formed by the direction of incidence of the evaporated atom and the normal of the substrate 1. Note that when an evaporation tape is fabricated, the initial angle of incidence $\phi i$ is 90° and the end angle of incidence $\phi f$ is about 30°. When $\phi i$ is 90° the direction of incidence of the evaporated atom is contacted with the substrate 1. In this case the shielding plate 7 can be omitted.

The end portion of the shielding plate 8 is provided with an oxygen introduction nozzle 9 for introducing oxygen into a vacuum tank of the vacuum evaporation device when evaporation is performed. By optimally controlling the introduction amount of oxygen, evaporation tape with excellent read/write characteristics and practical characteristic can be obtained.

With the object of further improving the read/write characteristics and the practical characteristic of the evaporation tape, in JPA 1-258226, JPA 5-151551, and JPA 5-334645 there is disclosed a technique where the initial growing portions of columnar grains forming a magnetic layer are caused to rise from a substrate by introducing gas near the magnetic layer formation start portion.

In addition, in JPA 2-236815 there is disclosed a technique where non-magnetic metal vapor with a low melting point is reflected and directed to a substrate by a tungsten plate heated to a high temperature in order to introduce into a magnetic layer the non-magnetic metal which does not melt with cobalt, instead of introducing oxygen into a vacuum evaporation device when the magnetic layer is formed.

The thin film magnetic recording medium, as described above, still requires the excellent read/write characteristics at short wavelength, that is, a high signal-to-noise (S/N) ratio in a short wavelength band and also still requires higher productivity.

In order to form a magnetic layer with a high S/N onto a traveling substrate by vacuum evaporation such as the aforementioned, it is generally known that the initial angle of incidence $\phi i$ of the magnetic layer formation start portion and the end angle of incidence $\phi f$ of the magnetic layer formation end portion are made large. However, if $\phi i$ and $\phi f$ are made large, then a high S/N can be obtained but the traveling speed of the substrate must be reduced when the magnetic layer is formed, resulting in a reduction in the productivity.

DISCLOSURE OF THE INVENTION

The present invention has been made in order to solve the aforementioned problems. Accordingly, the objective of the present invention is to provide a method of fabricating a thin film magnetic recording medium by which a thin film magnetic recording medium with a high S/N can be obtained with high productivity.

To achieve the above objective, a method of fabricating a thin film magnetic recording medium of the present invention is a method of fabricating a thin film magnetic recording medium where evaporation material is evaporated by a vacuum evaporation device onto a traveling substrate to form a magnetic layer. The subject matter of the present invention is summarized by in the following points.

1. The temperature of a reevaporation member, disposed so as to be opposed to the substrate on the downstream side of a magnetic layer formation start portion where the magnetic layer begins to form, is raised to higher than the melting point of an evaporation material. Atoms, which are evaporated from an evaporation source and reach said reevaporation member, are reevaporated by the raised temperature of the reevaporation member. The atoms reevaporated and atoms evaporated directly from said evaporation source are mixed together and then the mixed atoms are caused to reach said substrate at the same time to form the magnetic layer.

2. A reevaporation member for forming an under layer is disposed so as to be opposed to said substrate on the upstream side of said magnetic layer formation start portion. The temperature of said reevaporation member for forming an under layer is raised to higher than the melting point of said evaporation material. Atoms, which are evaporated from said evaporation source and reach said reevaporation member, are reevaporated by the raised temperature of said reevaporation member. At the same time, oxygen is supplied to a region on which the under layer on the upstream side of the magnetic layer formation start portion is formed. The reevaporated atoms are caused to reach said substrate in the presence of oxygen to form the under layer which becomes an under layer of the magnetic layer.

3. When oxygen is supplied to the region on which the under layer is formed, oxygen is supplied from the downstream side of the traveling substrate on the under layer formation region toward the upstream side of the traveling substrate.

4. By using a tension-applied thin plate as the reevaporation member, the initial shape of said reevaporation member can be held under a high-temperature condition which is higher than the melting point of the evaporation material.

5. A heat reflecting member is provided on the opposite side of the substrate across the reevaporation member and radiation heat is given to the reevaporation member.

6. A cooling member is provided on the opposite side of the substrate across the reevaporation member to prevent a rise in the temperature of a wall surface of the vacuum evaporation device.

7. A cooling member is provided on the opposite side of the substrate across the reevaporation member and a heat reflecting member is provided between the cooling member and said reevaporation member, thereby giving radiation heat to the reevaporation member and preventing a rise in the temperature of a wall surface of the vacuum evaporation device.

8. The heat reflecting member comprises carbon.

9. Current is caused to flow through the reevaporation member to raise the temperature of the reevaporation member by resistance heating, and current which equals the current flowing through said reevaporation member is caused to flow through the cooling member in the opposite direction.

10. A plurality of reevaporation members are used to cause currents to flow through adjacent reevaporation members in opposite directions and to raise the temperature of the reevaporation members by resistance heating.

11. A coil is provided near the reevaporation member and the cooling member and, by causing current to flow through the coil, there is generated a reducing magnetic field which cancels out a magnetic field generated by the current flowing through the reevaporation member and the cooling member.

In addition, the subject matter of the thin film magnetic recording medium of the present invention obtained by the aforementioned fabrication method resides in the following points.

12. The thin film magnetic recording medium of the present invention is a thin film magnetic recording medium fabricated by the aforementioned fabrication method 1. The film thickness of a magnetic layer is more than 10 nm and less than 50 nm. The magnetic layer is formed by mixing first atoms and second atoms together and then the mixed atoms are caused to reach the substrate at the same time, the first atoms being reevaporated from a reevaporation member disposed so as to be opposed to a substrate on the downstream side of a magnetic layer formation start portion where the magnetic layer begins to form and then going to the substrate, and the second atoms being evaporated from an evaporation source and going directly to said substrate.

13. The thin film magnetic recording medium of the present invention is a thin film magnetic recording medium fabricated by the aforementioned fabrication method 2. The film thickness of a magnetic layer is more than 10 nm and less than 50 nm. The magnetic layer is formed by mixing first atoms and second atoms together and then the mixed atoms is caused to reach the substrate at the same time, the first atoms being reevaporated from a reevaporation member disposed so as to be opposed to a substrate on the downstream side of a magnetic layer formation start portion where the magnetic layer begins to form and then going to the substrate, and the second atoms being evaporated from an evaporation source and going directly to said substrate. In addition, the film thickness of an under layer is 10 nm or more, and the under layer is formed by atoms, which are reevaporated from a reevaporation member for forming the under layer and go to the substrate.

In accordance with the present invention, the reevaporation member is disposed so as to be opposed to the substrate when the magnetic layer is formed onto the traveling substrate by a vacuum evaporation device. The temperature of the reevaporation member is raised to higher than the melting point of the evaporation material. Among the atoms evaporated from the evaporation source, the atoms reaching the reevaporation member are reevaporated by the raised temperature of the reevaporation member. In this way, the evaporated atoms which did not reach the substrate in the conventional fabrication method can be directed to the substrate. Therefore, some of the evaporated atoms, which did not contribute at all to the formation of the magnetic layer in the conventional fabrication method and were thrown away, can be utilized as a magnetic layer, and an enhancement in the productivity of the magnetic layer becomes possible.

In addition, the direction in which the reevaporated atoms emerge from the surface of the reevaporation member is originally the normal direction of the reevaporation member. If only with the reevaporated atoms from the reevaporation member which are incident on the substrate in the perpendicular direction, the film which is formed by these atoms will not sufficiently serve as a magnetic layer. According to the present invention, the atoms which are reevaporated from the reevaporation member and incident on the substrate in approximately the perpendicular direction and the atoms which are evaporated from the evaporation source and obliquely incident on the substrate are mixed with each other and caused to reach the substrate at the same time to form the magnetic layer. In practice, the magnetic layer is formed by the evaporated atoms obliquely incident on the substrate. Therefore, the evaporated atoms from the reevaporation member can be effectively utilized as a magnetic layer without damaging the characteristics of the magnetic layer obtained.

Furthermore, in the present invention, an additional reevaporation member for forming the under layer is provided so as to be opposed to the substrate on the upstream side of the magnetic layer formation start portion. With this, some of the evaporated atoms, which did not contribute to the formation of the magnetic layer in the conventional fabrication method and were thrown away, can be further effectively utilized in addition to the reevaporated atoms which are utilized by the installation of the reevaporation member. With this, an under layer which improves the crystal orientation of the magnetic layer can be formed as the under layer of the magnetic layer. That is, addition of the reevaporation member for forming the under layer can contribute to enhancement in the productivity and improvement in the magnetic properties and read/write characteristics.

BRIEF DESCRIPTION OF THE DRAWINGS

The present invention will be described in further detail with reference to the accompanying drawings, in which:

FIG. 8(*b*) is a schematic view showing the section of a magnetic layer formed by the vacuum evaporation device of the second embodiment that is used in the method of fabricating a thin film magnetic recording medium of the present invention;

FIG. 8(*c*) is a schematic view showing the section of a magnetic layer formed by a vacuum evaporation device that is used in a conventional fabrication method.

DESCRIPTION OF THE PREFERRED EMBODIMENTS

A preferred embodiment of the present invention will hereinafter be described in detail in reference to the drawings.

Figure 1:
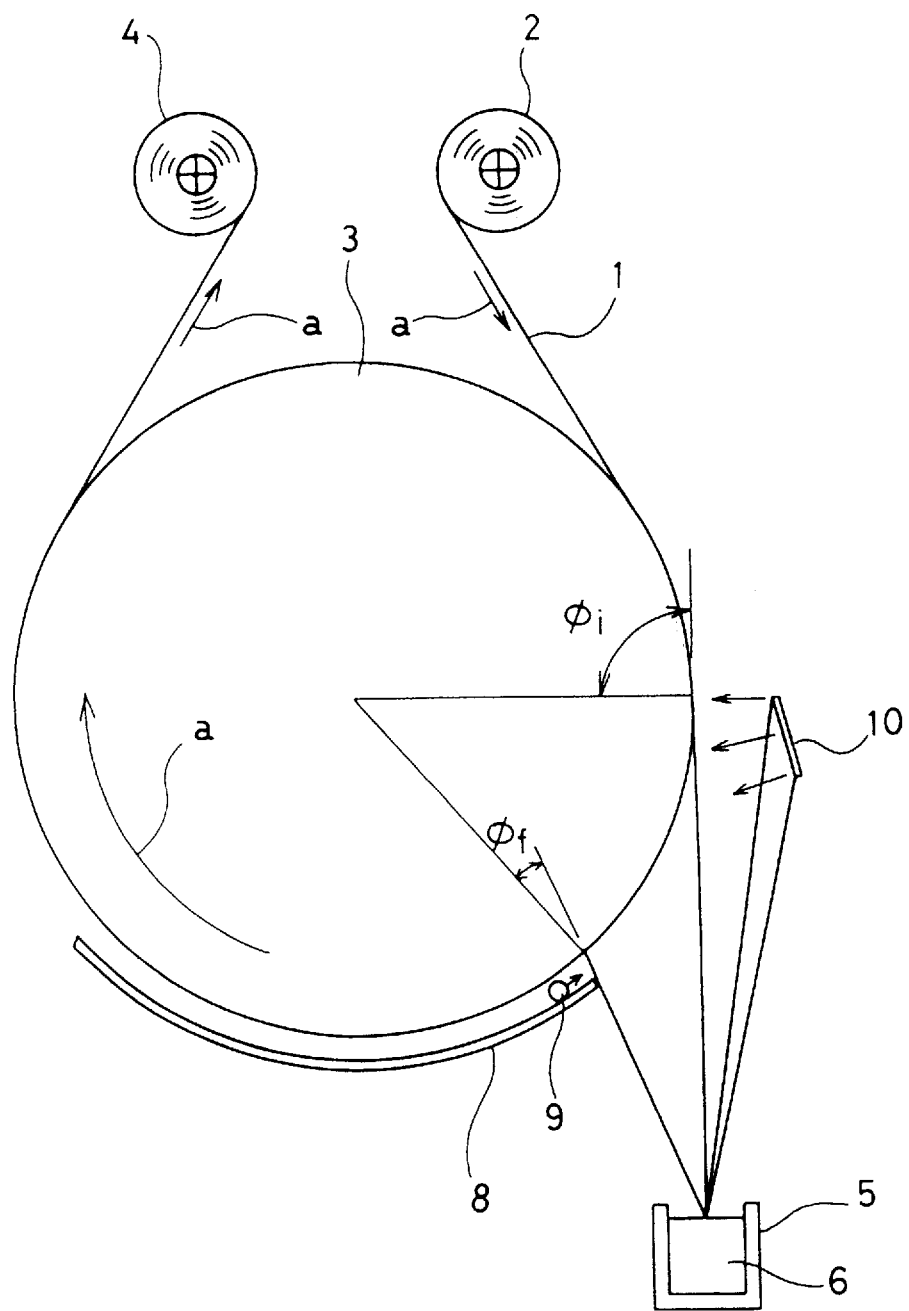
FIG. 1 is a diagrammatic sectional view showing the internal structure of a vacuum evaporation device of a first embodiment that is used in a method of fabricating a thin film magnetic recording medium of the present invention.

FIG. 1 shows a diagrammatic sectional view of the internal structure of a vacuum evaporation device of a first embodiment that is used in a method of fabricating a thin film magnetic recording medium of the present invention. In the figure, substrate traveling systems 1, 2, 3, and 4, evaporation sources 5 and 6, and an oxygen introduction nozzle 9 are approximately the same as the conventional device shown in FIG. 9. However, in the present invention a reevaporation member 10 is provided instead of using the shielding plate 7 of the conventional device.

It is necessary in the present invention to raise the temperature of the reevaporation member 10 to the extent that when evaporated atoms reached the reevaporation member 10, they can be evaporated again without adhering to the reevaporation member. Specifically, when the temperature of the reevaporation member 10 has been raised to higher than the melting point of an evaporation material 6, there will be almost no adhesion of evaporated atoms. In order to completely eliminate adhesion of evaporated atoms, the adhesion can be more effectively prevented, if the temperature of the reevaporation member 10 substantially is higher. However, it is preferable that the temperature of the reevaporation member 10 be suitably determined, taking the difficulty of raising temperature and the life of the reevaporation member 10 into consideration. In the case where the evaporation material 6 is cobalt, there will be almost no adhesion of cobalt atoms to the reevaporation member 10 and the evaporation material can be again evaporated stably, when the temperature is raised to approximately 1800° C.

The material forming the reevaporation member 10 is not limited to particular material but it is necessary that the shape can be maintained under a high temperature condition such as described above. It is also necessary that at the aforementioned high temperature the material of the reevaporation member 10 is chemically and metalically stable with respect to the evaporation material 6, and furthermore, it is necessary that material which can correspond to a means of raising temperature is chosen. Specifically, material with a high melting point, such as tungsten, molybdenum, carbon, and tantalum, may be used. However, if tantalum is used as the material of the reevaporation member 10 when the evaporation material 6 is cobalt, tantalum and cobalt will be easily united together and, even if the temperature were high enough, tantalum cobalt are alloyed earlier than cobalt atoms could be evaporated again. Then, as the alloying grows, the electric resistance changes and the melting point is also reduced. Therefore, it becomes difficult to maintain the reevaporation member 10 at a desired temperature. In addition, generally under high temperature conditions stress easily stays in the reevaporation member 10 and sometimes the reevaporation member 10 is physically damaged. For instance, carbon is a unique material that has a negative thermal expansion coefficient at high temperatures, and when this is used as material forming the reevaporation member 10, it contracts at high temperatures and is easily breakable.

Also, the means of raising the temperature of the reevaporation member 10 to higher than the melting point of the evaporation material 6 is not limited to particular means. For example, resistance heating, induction heating, and electron beam heating may be used. However, resistance heating is best choice, because the temperature can be raised to high the temperature with a relatively simple device structure and the temperature control is simple and the reproducibility is better.

As described above, a direction in which the reevaporated atoms emerge from the surface of the reevaporated member 10 is approximately the normal direction of the reevaporation member 10. Therefore, when the reevaporation member 10 is disposed so as to be opposed to the substrate 1, the incident direction of the reevaporated atoms from the reevaporation member 10 to the substrate 1 becomes approximately perpendicular. However, the film, formed on the substrate 1 by simply directing the evaporated atoms in the perpendicular incident direction, does not function sufficiently as a magnetic layer. In the present invention, in order to effectively use the atoms evaporated in the perpendicular incident direction from the reevaporation member 10 as a magnetic layer, the atoms which are evaporated substantially perpendicular from the reevaporation member 10 to the substrate 1 and the atoms which are evaporated obliquely from the evaporation source 5 to the substrate 1 are mixed with each other and arrives onto the substrate 1 at the same time to form a magnetic layer. This is application of the principles of a two-source vacuum evaporation method.

In the two-source vacuum evaporation method when atoms are evaporated from two evaporation sources toward a single substrate, the characteristics of the film deposited on the substrate 1 can be controlled with the respective angles of incidence and evaporating speeds as parameters. That is, the film is formed on the substrate 1 at the angle of incidence by the amount of evaporation, which are obtained by adding up and combining the respective angles of incidence of the vapor streams from the respective evaporation sources to the substrate and the respective amounts of evaporation.

In FIG. 1, an angle of incidence $\phi i$ at which the evaporated atom goes from the evaporation source 5 directly to the substrate 1 is 90° at a portion where formation of film is started. The reevaporated atom from the reevaporation member 10 is directed to the portion of the film formation start portion where the angle of incidence is relatively large. For this reason, the magnetic layer which is formed near the film formation start portion is formed by the vapor stream as a resultant product of the vertical incident atom from the reevaporated member 10 and the oblique incident atom from the evaporation source 5. That is, by mixing both evaporated atoms, the evaporated atom from the reevaporation member 10 is incident at an oblique angle to the substrate 1. If the evaporated atom is obliquely incident in this way, the film will have oblique magnetic anisotropy and exhibit a function as a magnetic layer of a thin film magnetic recording medium. Therefore, as shown in FIG. 1, some of the evaporated atoms, which did not contribute at all to the formation of the magnetic layer in the conventional fabrication method and were thrown away, can be utilized as a magnetic layer by disposing the reevaporation member 10 so as to be opposed to the substrate 1 on the downstream side of the magnetic layer formation start portion, and an enhancement in the productivity of the magnetic layer becomes possible.

Note that the technique, disclosed in JPA 2-23681 where an evaporated atom is reflected and directed to a substrate by a tungsten plate heated to a high temperature, is entirely different in principles and manner from the technique of the present invention, where the reevaporation member 10 is disposed so as to be opposed on the downstream side of the magnetic layer formation start portion and, among the evaporated atoms from a single evaporation source 5, the evaporated atoms which were thrown away in the conventional fabrication method are evaporated again and directed to the substrate 1 by the reevaporation member 10.

Figure 2:
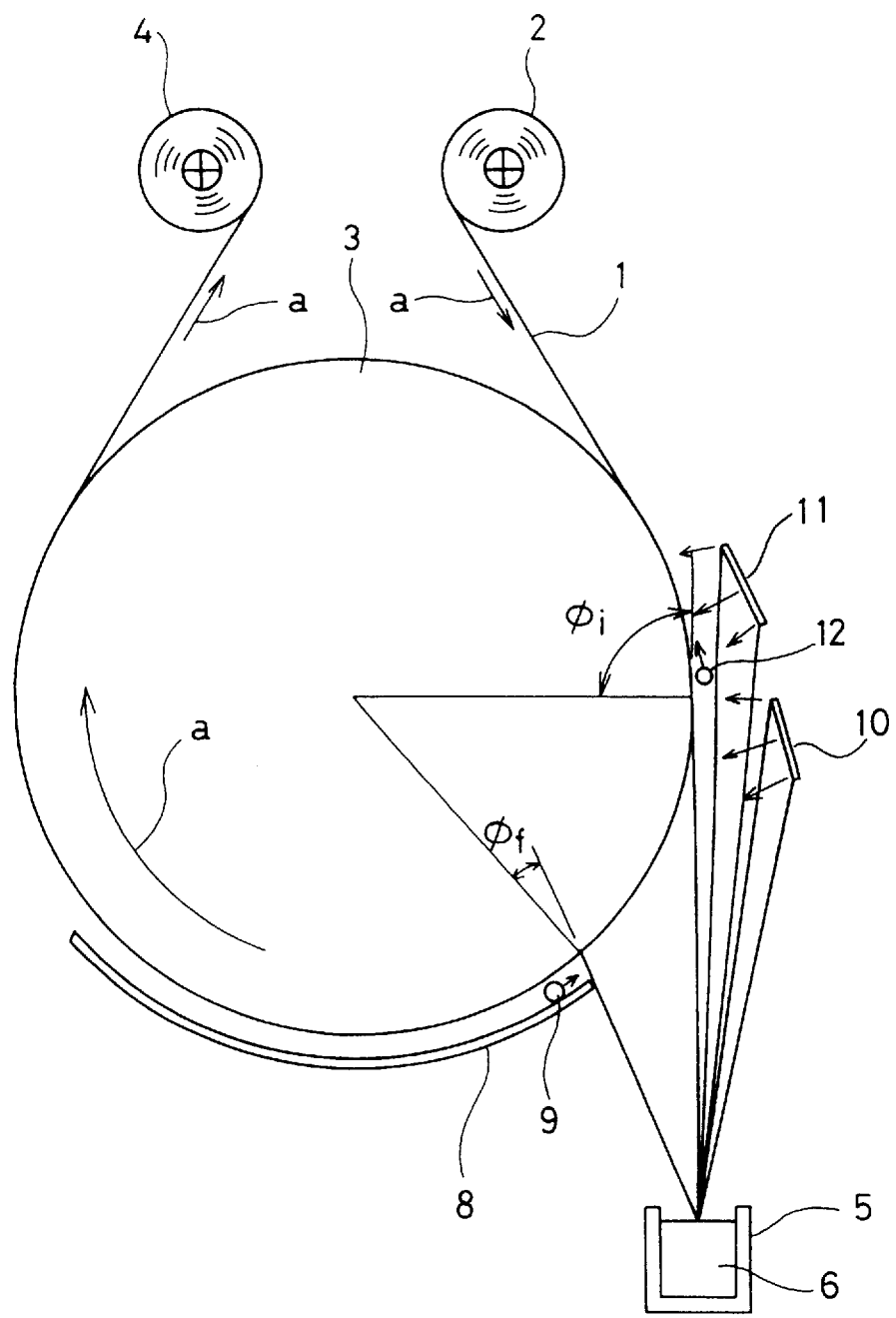
FIG. 2 is a diagrammatic sectional view showing the internal structure of a vacuum evaporation device of a second embodiment that is used in the method of fabricating a thin film magnetic recording medium of the present invention.

Next, a diagrammatic sectional view of the internal structure of a vacuum evaporation device which is the second embodiment of the present invention is shown in FIG. 2. In this embodiment the reevaporated atom from the reevaporation member is effectively used as an under layer which constitutes a magnetic layer. The structure of FIG. 2 is substantially the same as that shown in FIG. 1 but different in that a reevaporation member 11 for forming the under layer and an oxygen introduction nozzle 12 are newly added. Note that, even in this embodiment, the reevaporation member 10 fulfills the same function as the case of FIG. 1 described above.

The reevaporation member 11 for forming the under layer, as shown in FIG. 2, is disposed so as to be opposed to the substrate 1 on the upstream side of the reevaporation member 10. The temperature of the reevaporation member 11 for forming the under layer is also raised to higher than the melting point of the evaporation material 6. The evaporated atom reaching the reevaporation member 11 for forming the under layer is evaporated again at the surface of the reevaporation member 11 for forming the under layer and directed to the substrate 1. Then, the reevaporated atoms are deposited on the substrate 1 and form the under layer.

When the under layer is formed, the angle of incidence of the evaporated atom is not limited but may be perpendicular. However, if the magnetization of the under layer is great, the under layer will become not only a source of noise but also it will not be able to exhibit the effect of improving the crystal orientation of the magnetic layer which is subsequently formed on the under layer. Therefore, it is preferable that oxygen be introduced from the oxygen introduction nozzle 12 toward a region on which the under layer is formed in order to reduce the magnetization of the under layer.

If a large amount of oxygen is introduced from the oxygen introduction nozzle 12, the large amount of oxygen will stay on the magnetic layer formation region on the downstream side of the traveling direction of the substrate 1, and consequently, the magnetic characteristic of the entire magnetic layer and accordingly the reproduced output will be reduced. For this reason, it is desirable that the reevaporation member 11 and the oxygen introduction nozzle 12 be installed at positions which are as away as possible from the magnetic layer formation start portion to the upstream side of the traveling direction of the substrate 1. If, on the other hand, a very small amount of oxygen is introduced from the oxygen introduction nozzle 12, the saturation magnetization on the under layer will become large and an occurrence of noise will become conspicuous. Therefore, it is beneficial that the direction of emission of oxygen is directed from the downstream side of the traveling substrate 1 to the upstream side in order for oxygen emitted from the oxygen introduction nozzle 12 to go toward the under layer formation region and to not remain on the magnetic layer formation region. Thus, when oxygen is introduced from the oxygen introduction nozzle 12, it is important that the direction of emission and the amount are set so that the saturation magnetization of the under layer which is formed by the reevaporation member 11 is reduced sufficiently.

Figure 3:
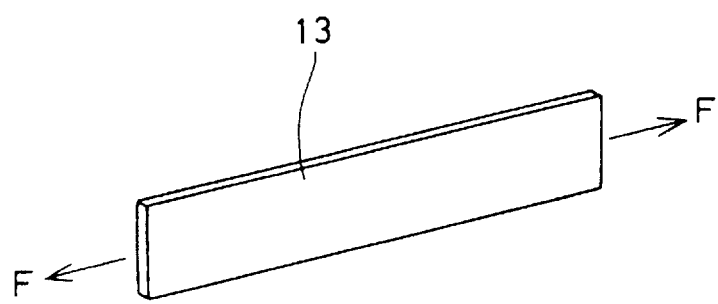
FIG. 3 is a perspective view showing an embodiment of the reevaporation member that is used in the method of fabricating a thin film magnetic recording medium of the present invention.

In the present invention the temperature of the reevaporation member 10 is raised to a relatively high temperature higher than the melting point of the evaporation material 6. Therefore, under a high-temperature condition such as this, the reevaporation member 10 is thermally expanded. There are cases where the reevaporation member 10 expands and is deformed, for example, at a high temperature and makes contact with another member. In the case of carbon, sometimes it expands and is deformed and makes contact with another member when it is cooled from a high temperature to a normal temperature. Applying tensile force F to the reevaporation member 10 is effective as a means of overcoming such thermal expansion. Specifically, a thin plate 13 to which tensile force F was applied as shown in FIG. 3 may be used as the reevaporation member 10. By applying tensile force F, the initial shape of the reevaporation member 10 can be held in both the case where the reevaporation member 10 expands due to temperature and the case where it contracts. Here a method of applying tensile force F is not limited to a particular method but it is important that the tensile force becomes approximately constant for the expansion and contraction of the reevaporation member 10. A simple method is to pull the reevaporation member 10 by means of a spring connected to one end or both ends of the member 10. At this time, it is preferable that the spring constant and the amount of displacement be set so that the spring sufficiently acts when the reevaporation member 10 is contracted. For instance, when metal is used as the reevaporation member 10, the amount of expansion is about 1 cm through 2 cm for overall length 70 cm. If the reevaporation member 10 is set in this way, approximately the initial shape of the reevaporation member 10 can be held even when it is contracted at a high temperature, thereby forming the stable magnetic layer. Also, in practice, it is difficult to apply tensile force F in the width direction of the reevaporation member 10, that is, in the narrow direction of the width of the thin plate 13 in FIG. 3. Therefore, in order to reduce the influence of thermal expansion, it is preferable that the width of the reevaporation member 10 be made as narrow as possible. Note that the foregoing description is true not only for the reevaporation member 10 but also for the reevaporation member 11 which is used for forming the under layer.

Figure 4:
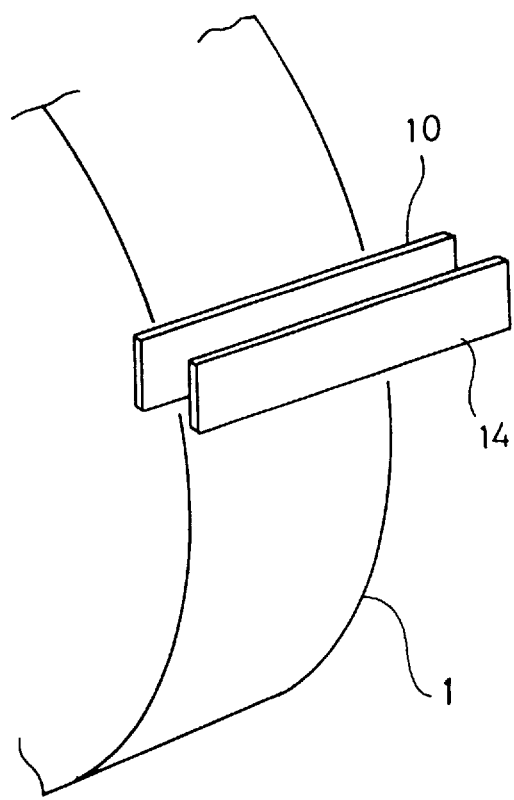
FIG. 4 is a perspective view showing the embodiment of the reevaporation member that is used in the method of fabricating a thin film magnetic recording medium of the present invention.

In the present invention, as shown in FIG. 4, it is desirable that a heat reflecting member 14 be provided on the opposite side of the substrate 1 across the reevaporation member 10. Thus, by disposing the heat reflecting member 14 so as to be opposed to the reevaporation member 10, the energy can be reduced which is needed when the temperature of the reevaporation member 10 is raised to a desired temperature. For example, in the case of resistance heating, electric power to be applied can be reduced. This method makes use of the radiation heat from the surface which is not opposed to the substrate 1, among the radiation heats from the reevaporation member 10. The temperature of the heat reflecting member 14 is raised by radiation heat from the reevaporation member 10. With radiation heat from the heat reflecting member 14 raised to a high temperature, thermal energy is supplied to the reevaporation member 10. It is desirable that material forming the heat reflecting member 14 be material whose radiant efficiency is high. For instance, carbon is a suitable material because it is higher in radiant efficiency than metal. In addition, a refractory material, such as a ceramic material, is usable, but attention must be paid because the refractory material is easily crackable due to the low heat conductivity. Although, in FIG. 4, only a single heat reflecting member 14 has been disposed, a plurality of heat reflecting members may be used for a single reevaporation member 10. If a plurality of heat reflecting members are used, heat reflection efficiency will be enhanced and a reduction in the thermal energy will be further enhanced. Note that the foregoing description is true not only for the reevaporation member 10 but also for the reevaporation member 11 which is used for forming the under layer.

Figure 5:
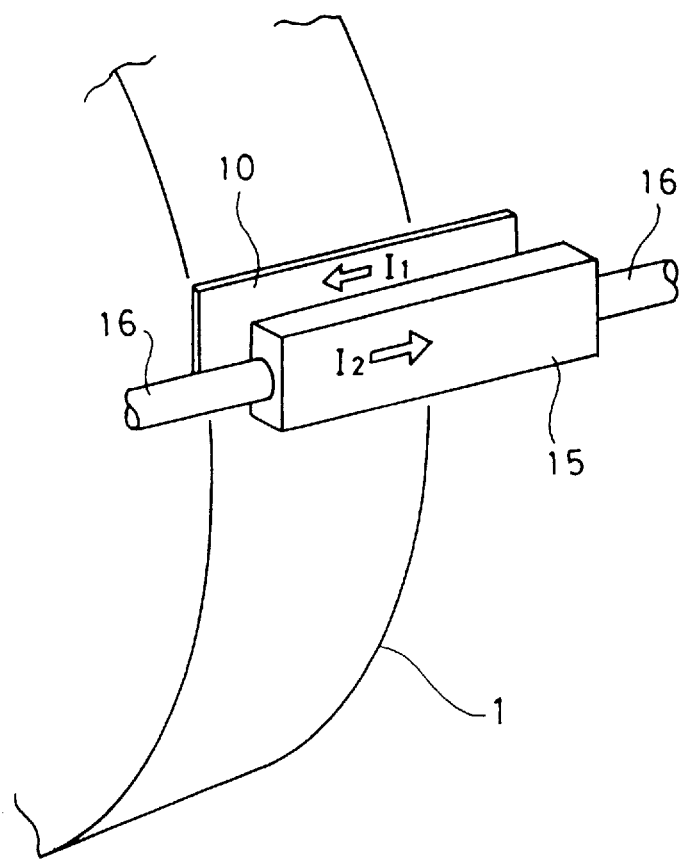
FIG. 5 is a perspective view showing another embodiment of the reevaporation member that is used in the method of fabricating a thin film magnetic recording medium of the present invention.

Also, in the present invention, as shown in FIG. 5, it is preferable that a cooling member 15 be provided on the opposite side of the substrate 1 across the reevaporation member 10. This is because the heat radiation from the reevaporation member 10 raised to a high temperature raises the temperature of a member in the vacuum evaporation device near the reevaporation member 10, such as a wall member, and therefore a large amount of gas is emitted from the wall surface of the vacuum evaporation device raised to a high temperature. In general, this gas tends to degrade the characteristics of a magnetic layer to be formed and the cooling member 15 is disposed in order to prevent the degradation. Cooling of the cooling member 15 may be performed by an arbitrary method, for example, circulating refrigerant through a pipe 16.

Figure 6:
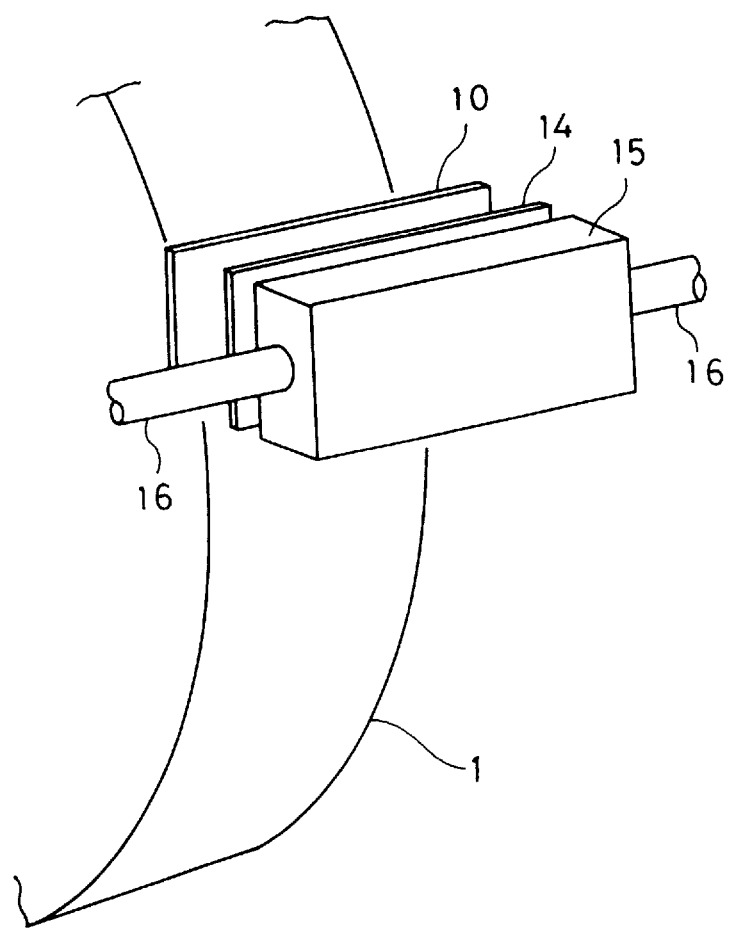
FIG. 6 is a perspective view showing still another embodiment of the reevaporation member that is used in the method of fabricating a thin film magnetic recording medium of the present invention.

In addition, it is most preferable in the present invention that the reevaporation member 10 be used together with the aforementioned heat reflecting member 14 and cooling member 15. In this case, as shown in FIG. 6, the cooling member 15 is provided on the opposite side of the substrate 1 across the reevaporation member 10 and the heat reflecting member 14 is disposed between the cooling member 15 and the reevaporation member 10.

Furthermore, it is preferable in the present invention that a current I2 which equals a current I1 flowing through the reevaporation member 10 is caused to flow through the cooling member 15 in the opposite direction, when the aforementioned structure of FIG. 5, that is, the cooling member 15 is disposed so as to be opposed to the reevaporation member 10. It is also preferable that the temperature raising means for the reevaporation member 10 is resistance heating and the cooling member 15 is conductive. The current I1, which flows when resistance heating is performed, depends upon the thickness or width of the reevaporation member 10 and is normally large and preferably about a few hundreds A. This is for solving the problem that the influence of a magnetic field arising due to the current I1 flowing through the reevaporation member 10 can not be neglected when charged particles, such as electrons and ions, are used in the portion of the substrate 1 opposed to the reevaporation member 10. That is, by causing the current I2 equal in size to the current I1 flowing through the reevaporation member 10 to flow through the cooling member 15 in the opposite direction, a magnetic field such as this can be reduced.

Figure 7:
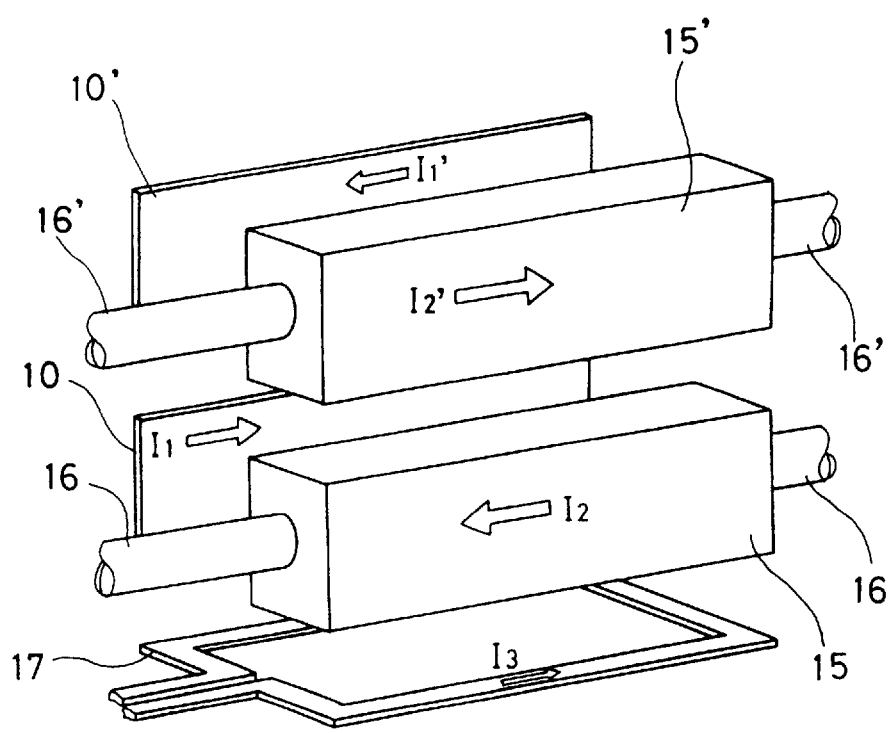
FIG. 7 is a perspective view showing a further embodiment of the reevaporation member that is used in the method of fabricating a thin film magnetic recording medium of the present invention.

In the present invention, as shown in FIG. 7, it is preferable that a plurality of combinations of the reevaporation member 10 and the cooling member 15 are disposed to further suppress the aforementioned influence of the magnetic field over a wide range. That is, in FIG. 7 a combination of a second reevaporation member 10' and a second cooling member 15' are disposed in addition to the combination of the reevaporation member 10 and the cooling member 15. In each of the combination of the reevaporation member 10 and the cooling member 15 and the combination of the second reevaporation member 10' and the second cooling member 15', the direction of the current I1(I1') flowing through the reevaporation member 10 (10') is opposite to that of the current I2 (I2') flowing through the cooling member 15 (15'). Furthermore, for the relation between the combination and the combination, the directions of the currents (I1 and I1') flowing through adjacent reevaporation members (10 and 10') are set so as to become opposite to each other and the directions of the currents (I2 and I2') flowing through adjacent cooling members (15 and 15') are set so as to become opposite to each other. With this, the magnetic field that is generated by the aforementioned two combinations can be reduced.

When it is desired that the influence of the magnetic field is further suppressed, it is preferable that a coil 17 be provided near the reevaporation member 10 and the cooling member 15 so that a current I3 flows through the coil 17. In this case a single turn of coil 17 such as the one shown in FIG. 7 may be used or a multiple turns of coil may be used. The disposition of the coil 17 is not limited to the position shown in FIG. 7. The disposition of the coil 17 will be sufficient if it is near the reevaporation member 10 and the cooling member 15 to the extent that the magnetic field can be reduced. Note that it is more preferable that the aforementioned heat reflecting member 14 be provided between the reevaporation member 10 and the cooling member 15 of each combination.

Figure 8A:
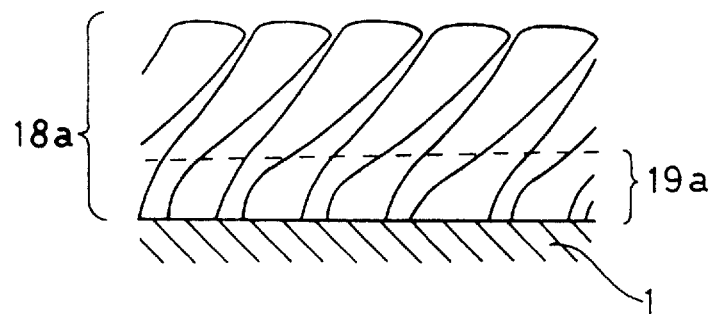
FIG. 8(*a*) is a schematic view showing the section of a magnetic layer formed by the vacuum evaporation device of the first embodiment that is used in the method of fabricating a thin film magnetic recording medium of the present invention.
Figure 8B:
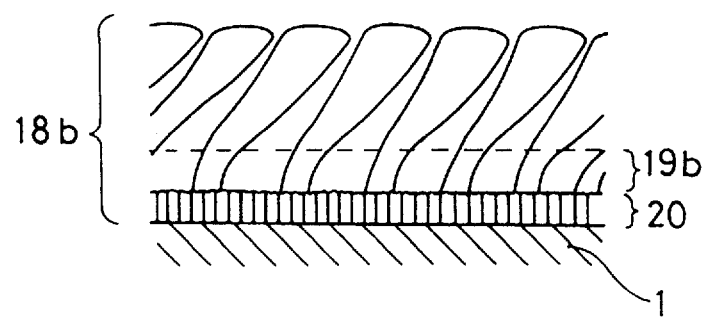
Figure 8C:
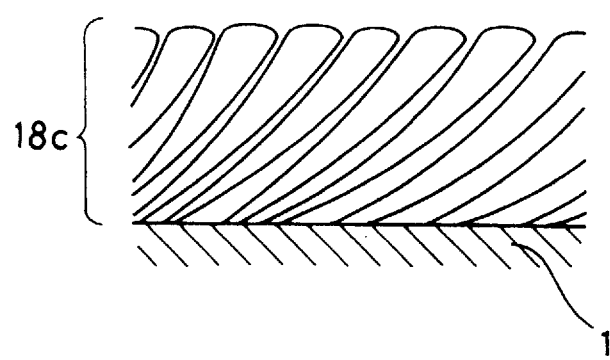

The thin film magnetic recording medium, which is obtained by the aforementioned fabrication method of the present invention, has a magnetic layer whose structure and characteristics are different from the thin film magnetic recording medium obtained by the conventional fabrication method. FIG. 8(a) schematically shows the section of the magnetic layer formed by the vacuum evaporation device of the aforementioned first embodiment shown in FIG. 1. FIG. 8(b) schematically shows the section of the magnetic layer formed by the vacuum evaporation device of the aforementioned second embodiment shown in FIG. 2. FIG. 8(c) schematically shows the section of the magnetic layer formed by a conventional vacuum evaporation device shown in FIG. 9. These magnetic layers will hereinafter be described. Note that although each magnetic layer is constituted by columnar grains, the space between the columnar grains is depicted in exaggeration on a greater scale than actual.

Figure 9:
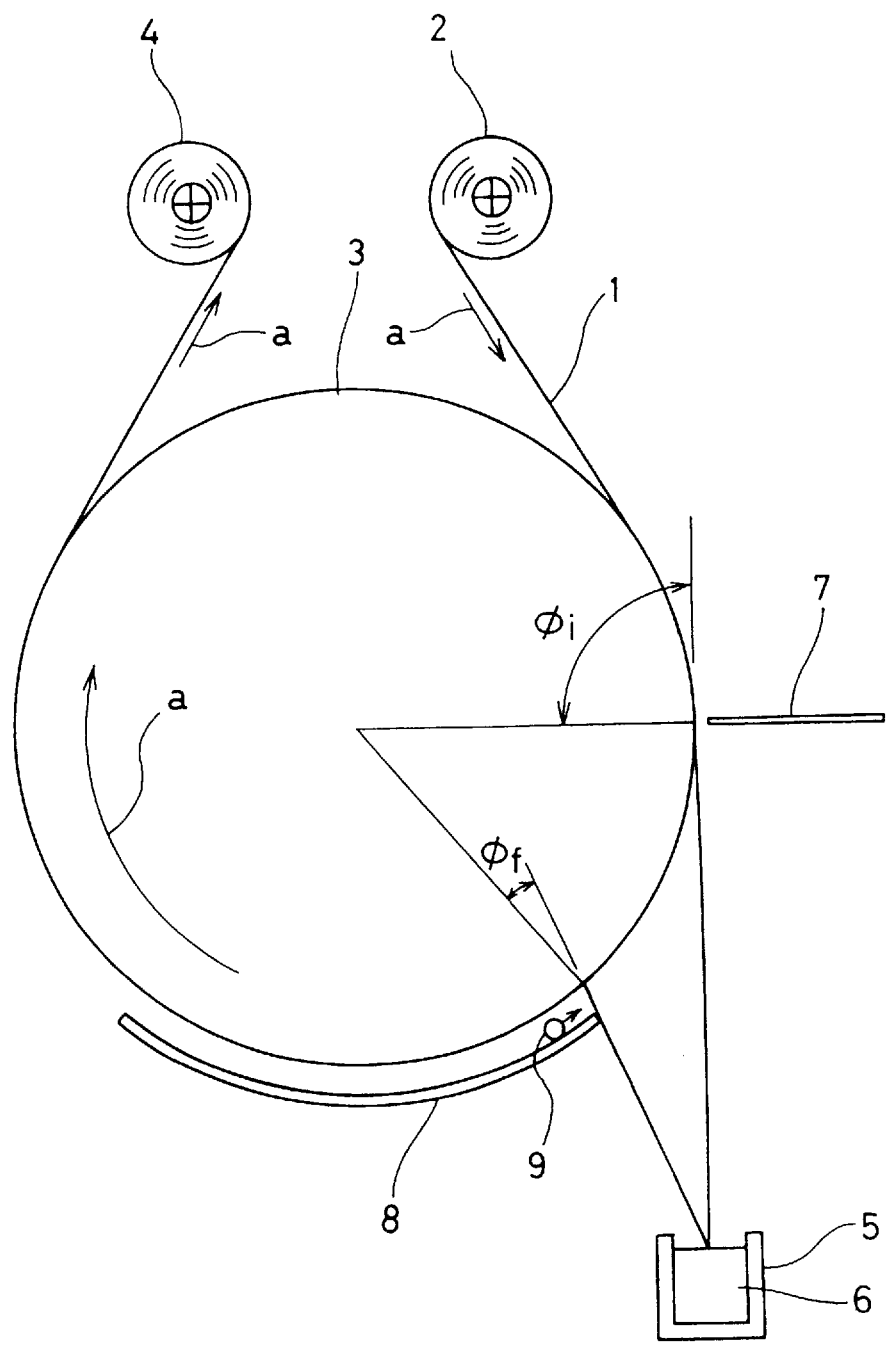
FIG. 9 is a diagrammatic sectional view showing the internal structure of a vacuum evaporation device that is used in a conventional method of fabricating a thin film magnetic recording medium of the present invention.

Initially, a description will be made of the magnetic layer formed by the conventional vacuum device shown in FIG. 9. In this case a magnetic layer 18c is formed while an angle of incidence is consecutively changing between the magnetic layer formation start portion and the magnetic layer formation end portion. Therefore, in correspondence with the change in the angle of incidence, as shown in FIG. 8(c), in the vicinity of the surface of the substrate 1 the columnar grains forming the magnetic layer 18c grow at a largely inclined angle to the substrate 1 and, in the vicinity of the surface of the magnetic layer 18c, the columnar grains rise from the substrate 1.

In contrast, as shown in FIG. 8(a), the magnetic layer 18a, formed by the vacuum evaporation device of the aforementioned first embodiment, is constituted by columnar grains, which reflected the fact that the reevaporated atom from the reevaporation member 10 and the directly evaporated atom from the evaporation source 5 are mixed with each other in the vicinity of the magnetic layer formation start portion and reach the substrate 1 at the same time. That is, the columnar grains constituting the magnetic layer 18a rise at the vapor mixed portion 19a near the surface of the substrate 1 and thereafter grow continuously and obliquely. In the vicinity of the magnetic layer formation start portion the reevaporated atoms from the reevaporation member 10 are more in number than the atoms reaching the substrate directly from the evaporation source 5, so the columnar grains rise from the surface of the substrate 1. Then, the number of atoms reaching the substrate 1 directly from the evaporation source 5 is rapidly increased from the vicinity of the magnetic layer formation start portion toward the downstream side of the traveling direction of the substrate 1, so the columnar grains obliquely grow in the same way as the columnar grains shown in FIG. 8(c).

Also, in the magnetic layer 18a formed by the vacuum evaporation device of the first embodiment, it is preferable from read/write characteristics that the film thickness of the vapor mixed portion 19a (i.e., the film formed by the reevaporated atom from the reevaporation member 10 and the directly evaporated atom from the evaporation source 5, which are mixed with each other and reach the substrate 1 at the same time) be 10 nm through 50 nm.

Note that the rising portion from the substrate in the initial growing portion of the columnar grains forming a magnetic layer, disclosed in JPA 1-258226, JPA 5-151551, and JPA 5-33463, is similar in shape to the vapor mixed portion 19a of the present invention which rises from the substrate 1 near the surface of the substrate 1. However, the rising portion in the prior art is formed by introducing gas in the vicinity of the magnetic layer formation start portion and diffusing atoms, whereas the vapor mixed portion of the present invention is formed by mixing two vapor streams in two directions. Therefore, the rising portion and the vapor mixed portion 19a entirely differ in magnetic and crystal characteristics.

On the other hand, in the magnetic layer 18b formed by the vacuum evaporation device of the aforementioned second embodiment, as shown in FIG. 8(b), an under layer 20, constituted by columnar grains grown substantially perpendicular to the substrate, exists near the surface of the substrate 1, because the reevaporated atom from the reevaporation member 11 for forming an under layer first reaches the substrate 1. Since the columnar grains of the under layer 20 are formed at an angle of incidence approximately perpendicular to the substrate surface, they are arranged more closely have greater proximity than those of the vapor mixed portion 19b which is subsequently formed on the under layer 20. This closeness contributes to an enhancement in the reliability and stiffness of the film. Furthermore, the under layer 20 combines with oxygen from the oxygen introduction nozzle 12 and is smaller in magnetization than the remaining portion of the magnetic layer 18b. On the under layer 20 the vapor mixed portion 19b, which consists of the reevaporated atom from the reevaporation member 10 and the directly evaporated atom from the evaporation source 5, is subsequently formed in the vicinity of the magnetic layer formation start portion. At the boundary between the under layer 20 and the vapor mixed portion 19b existing on the under layer 20, a relatively clear boundary line is observed, and discontinuity can be confirmed. Then, the number of atoms reaching the substrate 1 directly from the evaporation source 5, as with the first embodiment, is rapidly increased from the vicinity of the magnetic layer formation start portion toward the downstream side of the traveling direction of the substrate 1, so the columnar grains obliquely grow in the same way as the columnar grains shown in FIG. 8(c).

Also, in the magnetic layer 18b formed by the vacuum evaporation device of the second embodiment, as with the vapor mixed portion 19a in the aforementioned first embodiment, it is preferable that the film thickness of the vapor mixed portion 19b, formed by the reevaporated atom from the reevaporation member 10 and the directly evaporated atom from the evaporation source 5, is 10 nm through 50 nm.

Furthermore, in this embodiment, it is preferable from magnetic properties and read/write characteristic that the film thickness of the under layer 20 is 10 nm or more.

Note that the rising portion from the substrate in the initially grown portion of the columnar grains forming a magnetic layer, disclosed in JPA 1-258226, JPA 5-151551, and JPA 5-33463, differs in shape from the under layer 20 formed near the surface of the substrate 1 of the present invention. That is, the rising portion in the prior art is formed by introducing gas in the vicinity of the magnetic layer formation start portion and diffusing atoms, whereas the under layer 20 of the present invention is formed by an oxygen introducing method invented with the sole object of oxidizing reevaporated atoms which get from the reevaporation member 11 to the substrate 1 at an angle of approximately 90° at a position away from the magnetic layer formation start portion to the upstream side.

As described above, the structure of the magnetic layer, formed by the fabrication method of the present invention, is clearly distinguished from that of the magnetic layer formed by the conventional fabrication method.

EXAMPLES

The present invention will hereinafter be described with examples. The present invention, however, is not limited to these examples.

Example 1

In Example 1, evaporation tape was made by using the vacuum evaporation device shown in FIG. 1.

A cylindrical can 3 was 1.5 m in diameter and a polyethylene terephthalate film of width 50 cm and tape thickness 7 $\mu$m was used as the substrate 1. Cobalt (Co) was used as the evaporation material 6. The evaporation source 5 was disposed at a position 75 cm away horizontally from just under the center of the cylindrical can 3 to the upstream side of the traveling direction of the substrate and also at a position 1 m below in the vertical direction from the center of the cylindrical can 3. A carbon film of film thickness 0.25 mm (made by Kojundo Chemical Laboratory Co., Ltd.) is used as the reevaporation member 10. The length in the width direction of the substrate is 70 cm and the length in the traveling direction of the substrate is 15 cm. The height of the upper end of this reevaporation member 10 is made equal to the center of the cylindrical can 3 and the distance from the circumference of the cylindrical can 3 is set to 15 cm. Also, as shown in FIG. 1, the lower end of the reevaporation member 10 is inclined away from the vertical line and the angle of inclination is 15°. Then, a current of about 900 A was caused to flow through the reevaporation member 10 so that the temperature is increased up to about 1800° C. With this, the atoms, which were gotten from the evaporation source 5 to the reevaporation member 10 and were reevaporated in the direction substantially normal to the surface of the reevaporation member 10, are mixed with the atoms evaporated directly from the evaporation source 5 in the vicinity of the magnetic layer formation start portion, and the mixed atoms are deposited on the substrate 1. At this time, the initial angle of incidence $\phi$i was 90° and the end angle of incidence $\phi$f 50°.

Under conditions as described above, the evaporating speed of atoms and the traveling speed of the substrate were set so that the entire film thickness of the magnetic layer 18a attained about 160 nm, and a Co—O film was made, introducing oxygen of 1.2 liter per minute from the oxygen introduction nozzle 9. This is referred to as sample 1.

Next, in order to make a comparison about the production efficiency of the conventional fabrication method, a Co—O film was made under the same conditions as above with no reevaporation member 10. The film thickness at that time was about 140 nm. From this it is found that the film thickness due to the contribution of the reevaporation member 10 is about 20 nm. In other words, an enhancement of about 14% in the production efficiency has been achieved as compared with the case where there is no reevaporation member 10.

Furthermore, in order to make a comparison about magnetic properties and read/write characteristic, a Co—O film of film thickness about 160 nm was made with no reevaporation member 10 as in the aforementioned and at the traveling speed of the substrate reduced by about 14%. This is referred to as reference sample 1.

When sample 1 and reference sample 1 were compared about the coercive force and squareness of the static magnetic properties, 103 kA/m and 0.78 were obtained for sample 1 and 120 kA/m and 0.69 were obtained for reference sample 1. It is considered that the reason why the coercive force of the sample 1 is low is that the initial angle of incidence $\phi$i of the film formation start portion of this film becomes considerably low as compared with 90° due to the mixing of the atom from the evaporation source 5 with the reevaporated atom from the reevaporation member 10. It is considered that, on the other hand, the reason that the squareness is large is that the magnetic anisotropic dispersion is suppressed due to the small initial angle of incidence $\phi$i.

For the comparison of the read/write characteristic, each sample was slit into a tape shape and the read/write characteristic was evaluated at a recording wavelength of 0.5 $\mu$m by using a ring type magnetic head of gap length 0.15 $\mu$m made from Sendust. As a result, the sample 1 of the present invention using the reevaporation member 10 was about 1.5 dB higher for both reproduced output and the reproduced output/noise than the reference sample 1 of the conventional fabrication method. It is considered that the reason is due to squareness of the sample 1 is large although the coercive force is slightly low.

From the foregoing description it was found that a thin film magnetic recording medium with high productivity and high performance could be fabricated by providing the reevaporation member 10.

Observing the section of the magnetic layer of the sample 1 with a scanning electron microscope, it was observed that the magnetic layer was formed from columnar grains such as those shown in FIG. 8(a) and that the film thickness of the vapor mixed portion 19a was about 30 nm through 40 nm. The aforementioned examination showed that the film thickness due to the contribution of the reevaporation member 10 was about 20 nm and also shows that in the actual film the atoms, which reevaporate from the reevaporation member 10 and contribute to the formation of the magnetic layer, extend from the magnetic layer formation start portion to about 30 nm to 40 nm in the range of the film thickness of the magnetic layer. If an even closer analysis is possible, it will be considered that it will become clear that the reevaporated atoms from the reevaporation member 10 will extend over the entire magnetic layer. However, the amount of the atoms which are evaporated directly from the evaporation source 5 is overwhelmingly increased as they get nearer to the magnetic layer formation end portion, but, on the other hand, the amount of the reevaporated atoms from the reevaporation member 10 is rapidly reduced as they get nearer to the magnetic layer formation end portion. For this reason, when the reevaporated atoms from the reevaporation member 10 reaches the vicinity of the magnetic layer formation end portion, their contribution to an enhancement in the productivity is slight and it is considered that their contribution to the magnetic characteristic can be neglected.

Example 2

To examine the influence of the film thickness of the vapor mixed portion, a magnetic layer was formed in the same way as Example 1, except that the reevaporation member 10 was varied in length. That is, the position of the upper end of the reevaporation member 10 and the angle of incidence were made equal to the Example 1. The length was varied between 3 cm and 30 cm and a magnetic layer where the film thickness of the vapor mixed portion 19a ranges between about 5 nm and about 70 nm was formed.

For the obtained sample, the read/write characteristic was evaluated by the same method as the Example 1. The reproduced output and reproduced output/noise, which are +0.5 dB higher than the reference sample 1 fabricated by the conventional fabrication method, were obtained for samples whose film thickness ranges between about 10 nm and about 50 nm. Also, the reproduced output and reproduced output/noise of more than +1 dB were obtained for samples whose film thickness ranges between about 15 nm and about 35 nm.

From the foregoing description it was found that the film thickness of the vapor mixed portion in the Example 1 was satisfactory between about 10 nm and about 50 nm and more satisfactory between about 15 nm and about 35 nm.

Example 3

Evaporation tape was made with the vacuum evaporation device shown in FIG. 2.

The disposition and size of the cylindrical can 3, the substrate 1, the evaporation material 6, the evaporation source 5, and the reevaporation member 10 were made similar to Example 1.

A carbon film of film thickness 0.25 mm similar to Example 1 (made by Kojundo Chemical Laboratory Co., Ltd.) is used as the reevaporation member 11 for forming an under layer. The length in the width direction of the substrate was 70 cm. This reevaporation member 11 for forming an under layer is divided into two parts, as shown in FIG. 7, and the length of each part in the traveling direction of the substrate 1 was 15 cm and the entire length was 30 cm. The height of the upper end of this reevaporation member 11 for forming an under layer was 42 cm above the center of a cylindrical can 3 and the distance from the circumference of the cylindrical can 3 was set to 11 cm. Also, as shown in FIG. 2, the lower end of the reevaporation member 11 for forming an under layer was inclined with respect to the vertical line so that it goes away from the cylindrical can 3, and the angle of inclination was set to 23°. Then, a current of about 1800 A was caused to flow through the reevaporation member 11 so that the temperature is increased up to about 1800° C. With this, the atoms, which were made available from the evaporation source 5 to the reevaporation member 11 and were reevaporated in the direction substantially normal to the surface of the reevaporation member 11, reach the substrate 1 at the incidence angle of approximately 90° and are deposited on the substrate 1. At this time, the initial angle of incidence $\phi i$ was 90° and the end angle of incidence $\phi f$ 50°.

The oxygen introduction nozzle 12 was provided at a position 5 cm away upward from a horizontal line passing through the center of the cylindrical can 3, and the distance from the circumference of the cylindrical can 3 was set to 2 cm. As shown in FIG. 2, the direction in which oxygen is blown out was directed to the upstream side of the traveling direction of the substrate 1.

Under conditions as described above, the evaporating speed was the same as the Example 1 and traveling speed of the substrate was set so that the entire film thickness of the magnetic layer 18b attains about 160 nm. A Co—O film was made, introducing oxygen of 1.2 liter per minute from the oxygen introduction nozzle 9 and oxygen of 0.8 liter per minute from the oxygen introduction nozzle 12. This is referred to as sample 2. The traveling speed of the substrate had to be increased by about 30%, as compared with the case where sample 1 was made in Example 1.

The coercive force and squareness of the static magnetic properties of an obtained sample 2 were 125 kA/m and 0.85. As with Example 1, each sample was slit into a tape shape for making a comparison about the read/write characteristic. The read/write characteristic was evaluated at a recording wavelength of 0.5 $\mu$m by using a ring type magnetic head of gap length 0.15 $\mu$m made from Sendust. As a result, the sample 2 was about 1.5 dB higher for both reproduced output and the reproduced output/noise than sample 1. From this fact it is considered that the coercive force and the squareness were improved as compared with sample 1.

It is considered that an excellent advantageous effect such as this is because formation of the under layer 20 improved the crystal orientation of the magnetic layer which is formed on the under layer 20. That is, it is considered that although the inclined magnetic layer portion has become relatively thin, the read/write characteristic is improved because of the improved crystal orientation.

Observing the section of the magnetic layer of the sample 2 with a scanning electron microscope, it was observed that the magnetic layer had been constituted by inclined columnar grains and approximately vertically and closely arranged columnar grains formed on the substrate surface, as shown in FIG. 8(b). It was also observed that the film thickness of the under layer 20 consisting of columnar grains near the substrate surface was about 30 nm and the film thickness of the vapor mixed portion 19b about 20 nm to 30 nm.

Comparing the productivity of this example by the magnetic layer forming speed, the productivity was increased by about 45% as compared with reference sample 1 made by the conventional fabrication method.

Example 4

To examine the influence of the film thickness of the under layer, a magnetic layer was formed in the same way as Example 3, except that the reevaporation member 11 for forming an under layer was varied in length. That is, the position of the upper end of the reevaporation member 11 and the angle of inclination were made equal to Example 3. The length in the traveling direction of the substrate was varied between 5 cm and 40 cm and a magnetic layer where the film thickness of the under layer 20 ranges between about 5 nm and about 50 nm was formed.

For the obtained sample, the read/write characteristic was evaluated by the same method as the Example 1. As a result, the static magnetic properties and the read/write characteristic are both enhanced, as the film thickness of the under layer 20 is increased. However, when the film thickness of the under layer 20 is about 20 nm or more, the advantageous effect tends to saturate. Furthermore, it was found that the film thickness of the under layer was satisfactory if it is about 10 nm or more and that the film thickness was more satisfactory if it is about 20 nm or more.

In addition, the film thickness of the under layer 20 was set to a fixed number of 30 nm, and as with Example 2, a magnetic layer was formed, changing the length of the reevaporation member 10. Under these conditions, the characteristics were examined. It was found that the film thickness of the vapor mixed portion 19b in FIG. 8(b), as with the case of FIG. 8(a), was satisfactory between about 10 nm and about 50 nm and more satisfactory between about 15 nm and about 35 nm.

Example 5

A carbon plate of approximately the same size as the reevaporation member 10 and thickness 2 mm was used as the heat reflecting member 14 and, as shown in FIG. 4, the plate was disposed about 1 cm away from the reevaporation member 10. In the same vacuum evaporation device as the Example 1, resistance heating was performed until the reevaporation member 10 reaches about 1800° C. The electric power required for the reevaporation member 10 to reach about 1800° C. was reduced by about 20% when resistance heating was performed, as compared with the case where there is no carbon plate. The power reduction effect of the heat reflecting member 14, if the thickness is constant, will become greater when a plurality of thin heat reflecting members are used. It was found that the maximum reduction effect was about 35%.

Example 6

As shown in FIG. 5, a magnetic layer was formed in the same way as Example 1, except that a cooling member 15 made of copper was disposed about 5 cm away in opposition to the reevaporation member 10 and identical in size with the reevaporation member 10. At this time, the cooling member 15 was cooled by water flowing through a pipe 16 welded to the cooling member 15. As a result, the temperature of the wall surface of the vacuum evaporation device, which was partially raised to higher than 200° C. in Example 1, became less than 100° C., and the coercive force and squareness of the formed magnetic layer were 110 kA/m and 0.80. In addition, because of improvement in the static magnetic properties, reproduced output and reproduced output/noise of more than 0.2 dB were obtained for sample 1 and improvement in the read/write characteristic was confirmed.

Example 7

In addition to the structure of the vacuum evaporation device of the Example 6, a heat reflecting member 14 was disposed between the reevaporation member 10 and the cooling member 15, as shown in FIG. 6. A magnetic layer was formed in the same way as the Example 6 except for the heat reflecting member 14. As a result, the temperature of the wall surface of the vacuum evaporation device was further reduced as compared with the case of the Example 6, and the coercive force and squareness of the formed magnetic layer were 115 kA/m and 0.81. In addition, because of improvement in the static magnetic properties, reproduced output and reproduced output/noise of more than 0.3 dB were obtained for the sample 1 and improvement in the read/write characteristic was confirmed.

Example 8

In the same vacuum evaporation device as Example 1, a Pierce electron gun was used as a source of heating the evaporation source 5. When the beam of electrons from the electron gun was scanned to heat the evaporation source 5, a phenomenon where the electron beam is deflected by a magnetic field was recognized. If the electron beam is deflected, this deflection will need to be corrected and the setting of the electron beam will become complicated. The following three countermeasures were taken in order to avoid the aforemention ed problems. The length of the reevaporation member 10 in the traveling direction of the substrate was 30 cm and the current required at this time was 1800 A.

As the first countermeasure, a current I1' which is identical with a current I1 flowing through the reevaporation member 10 is caused to flow through the cooling member 15, as shown in FIG. 5. As a result, the magnetic field of the space, enclosed by the reevaporation member 10 and the cooling member 15, becomes stronger, but the magnetic field of the space other than the space enclosed by the reevaporation member 10 and the cooling member 15 is weakened. Therefore, the deflection of the electron beam was considerably suppressed and the setting of the electron beam became comparatively easy.

As the second countermeasure, each of the reevaporation member 10 and the cooling member 15 is divided into two parts, as shown in FIG. 7. As a result, the current value needed for a single reevaporation member 10 was reduced by 50%. Furthermore, as shown in FIG. 7, the directions of the currents flowing through the two reevaporation members 10 were set so as to become opposite to each other, and the directions of the currents (I2 and I2') flowing through each set of the reevaporation member 10 and the cooling member 15 were set so as to become opposite to each other. With this, the magnetic field that is generated by the reevaporation members 10 could be considerably reduced.

As the third countermeasure, a single turn of coil 17 was disposed near the reevaporation member 10 and the cooling member 15 and a current I3 was caused to flow through the coil 17, as shown in FIG. 7. At this time, the orientation and size of this current I3 were adjusted, viewing the degree of deflection of the electron beam.

The advantages of the aforementioned three countermeasures appeared in the evaporating speed. That is, with the evaporating speed as a reference, an improvement of about 3% was recognized in the first countermeasure. Also, an improvement of about 6% was recognized in the second countermeasure where the reevaporation member is divided into two parts. Furthermore, an improvement of about 10% was recognized in the third countermeasure where current flows through the lower coil.

We claim:

1. In a method of fabricating a thin film magnetic recording medium where vapor evaporation is effected by a vacuum evaporation device onto a traveling substrate to form a magnetic layer, the method comprising the steps of:

raising, to higher than the melting point of an evaporation material, the temperature of a reevaporation member disposed so as to be opposed to the substrate on the downstream side of a magnetic layer formation start portion where said magnetic layer begins to form;

reevaporating atoms, which are evaporated from an evaporation source and reach said reevaporation member, by the raised temperature of the reevaporation member;

mixing the atoms reevaporated and atoms evaporated directly from said evaporation source together and then causing the mixed atoms to reach said substrate at the same time to form said magnetic layer.

2. The method of fabricating a thin film magnetic recording medium, as set forth in claim 1, wherein a reevaporation member for forming an under layer is disposed so as to be opposed to said substrate on the upstream side of said magnetic layer formation start portion;

the temperature of said reevaporation member for forming an under layer is raised to higher than the melting point of said evaporation material; p1 atoms, which are evaporated from said evaporation source and reach said reevaporation member for forming said under layer, are reevaporated by the raised temperature of said reevaporation member;

at the same time, oxygen is supplied to a region on which the under layer on the upstream side of the magnetic layer formation start portion is formed; and the reevaporated atoms are caused to reach said substrate in the presence of oxygen to form the under layer which becomes an under layer of the magnetic layer.

3. The method of fabricating a thin film magnetic recording medium, as set forth in claim 2, wherein, when oxygen is supplied to the region on which the under layer is formed, oxygen is supplied from the downstream side of the traveling substrate on the under layer formation region toward the upstream side of the traveling substrate.

4. The method of fabricating a thin film magnetic recording medium as set forth in claim 2 further comprising:

forming said magnetic layer with a thickness of more than 10 nm and less than 50 nm by mixing first atoms and second atoms together and then causing the mixed atoms to reach the substrate at the same time, the first atoms being reevaporated from said reevaporation member disposed so as to be opposed to the substrate on the downstream side of said magnetic layer formation start portion where said magnetic layer begins to form and then being supplied to the substrate, and the second atoms being evaporated from an evaporation source and being supplied directly to the substrate; and forming said under layer with a thickness of 10 nm or more with atoms which are reevaporated from reevaporation member for forming the under layer and supplied to the substrate.

5. The method of fabricating a thin film magnetic recording medium, as set forth in claim 1 wherein a heat reflecting member is provided on the opposite side of the substrate across the reevaporation member and radiation heat is given to the reevaporation member.

6. The method of fabricating a thin film magnetic recording medium, as set forth in claim 5, wherein the heat reflecting member comprises carbon.

7. The method of fabricating a thin film magnetic recording medium, as set forth in claim 1 wherein a cooling member is provided on the opposite side of the substrate across the reevaporation member and a heat reflecting member is provided between the cooling member and said reevaporation member, thereby giving radiation heat to the reevaporation member and preventing a rise in the temperature of a wall surface of the vacuum evaporation device.

8. The method of fabricating a thin film magnetic recording medium, as set forth in claim 1 wherein a cooling member is provided on the opposite side of the substrate across the reevaporation member to prevent a rise in the temperature of a wall surface of the vacuum evaporation device.

9. The method of fabricating a thin film magnetic recording medium, as set forth in claim 8, wherein current is caused to flow through the reevaporation member to raise the temperature of the reevaporation member by resistance heating, and current which equals the current flowing through said reevaporation member is caused to flow through the cooling member in the opposite direction.

10. The method of fabricating a thin film magnetic recording medium, as set forth in claim 9, wherein a coil is provided near the reevaporation member and the cooling member and, by causing current to flow through the coil, there is generated a reducing magnetic field which cancels out a magnetic field generated by the current flowing through the reevaporation member and the cooling member.

11. The method of fabricating a thin film magnetic recording medium, as set forth in claim 1 wherein a plurality of reevaporation members are used to cause currents to flow through adjacent reevaporation members in opposite directions and to raise the temperatures of the reevaporation members by resistance heating.

12. The method of fabricating a thin film magnetic recording medium as set forth in claim 1 further comprising:

forming said magnetic layer with a thickness of more than 10 nm and less than 50 nm by mixing first atoms and second atoms together and then causing the mixed atoms to reach the substrate at the same time, the first atoms being reevaporated from said reevaporation member disposed so as to be opposed to the substrate on the downstream side of said magnetic layer formation start portion where said magnetic layer begins to form and then being supplied to the substrate, and the second atoms being evaporated from an evaporation source and being supplied directly to the substrate.

13. The method of fabricating a thin film magnetic recording medium, as set forth in claim 1 wherein, by using a tension-applied thin plate as the reevaporation member, the initial shape of said reevaporation member can be held under a high-temperature condition which is higher than the melting point of the evaporation material.

14. A thin film magnetic recording medium, comprising:

a substrate; and single magnetic layer disposed on said substrate, said single magnetic layer comprising columnar grains having a first portion rising with a first slope substantially perpendicularly from said substrate and a second portion integral with said first portion rising with a second slope less than said first slope and inclining obliquely with respect to said substrate, wherein said first portion of said columnar grains comprises a mixture of first and second atoms, said first atoms having been reevaporated from a reevaporating member and being disposed on said substrate on a downstream side of a magnetic layer formation start portion and said second atoms having been evaporated from an evaporation source and being disposed directly on said substrate.

15. A thin film magnetic recording medium as set forth in claim 14, wherein the film thickness of said first portion of said columnar grains is more than 10 nm and less than 50 nm.

16. A thin film magnetic recording medium, comprising:

a substrate;

a thin film under layer disposed on said substrate comprising atoms reevaporated from a first reevaporating member and forming grains rising substantially perpendicularly from said substrate, said grains being arranged with a first proximity and having a first magnetization; and a single magnetic layer disposed on said thin film under layer, said single magnetic layer comprising columnar grains having a first portion rising with a first slope substantially perpendicularly with respect to said substrate and a second portion integral with said first portion rising with a second slope less than said first slope and inclining obliquely with respect to said substrate, said first portion of said columnar grains having (i) grains being arranged with a second proximity less than said first proximity and (ii) having a second magnetization greater than said first magnetization, said first portion of said columnar grains comprising a mixture of first atoms and second atoms, said first atoms having been reevaporated from a second reevaporating member and being disposed on said substrate on a downstream side of a magnetic layer formation start portion and said second atoms having been evaporated from an evaporation source and being disposed directly on said substrate.

17. A thin film magnetic recording medium as set forth in claim 16, wherein said thin film under layer has a thickness that is more than 10 nm thick and said first portion of said columnar grains has a thickness that is more than 10 nm and less than 50 nm.

* * * * *